United States Patent Office 2,790,263
Patented Apr. 30, 1957

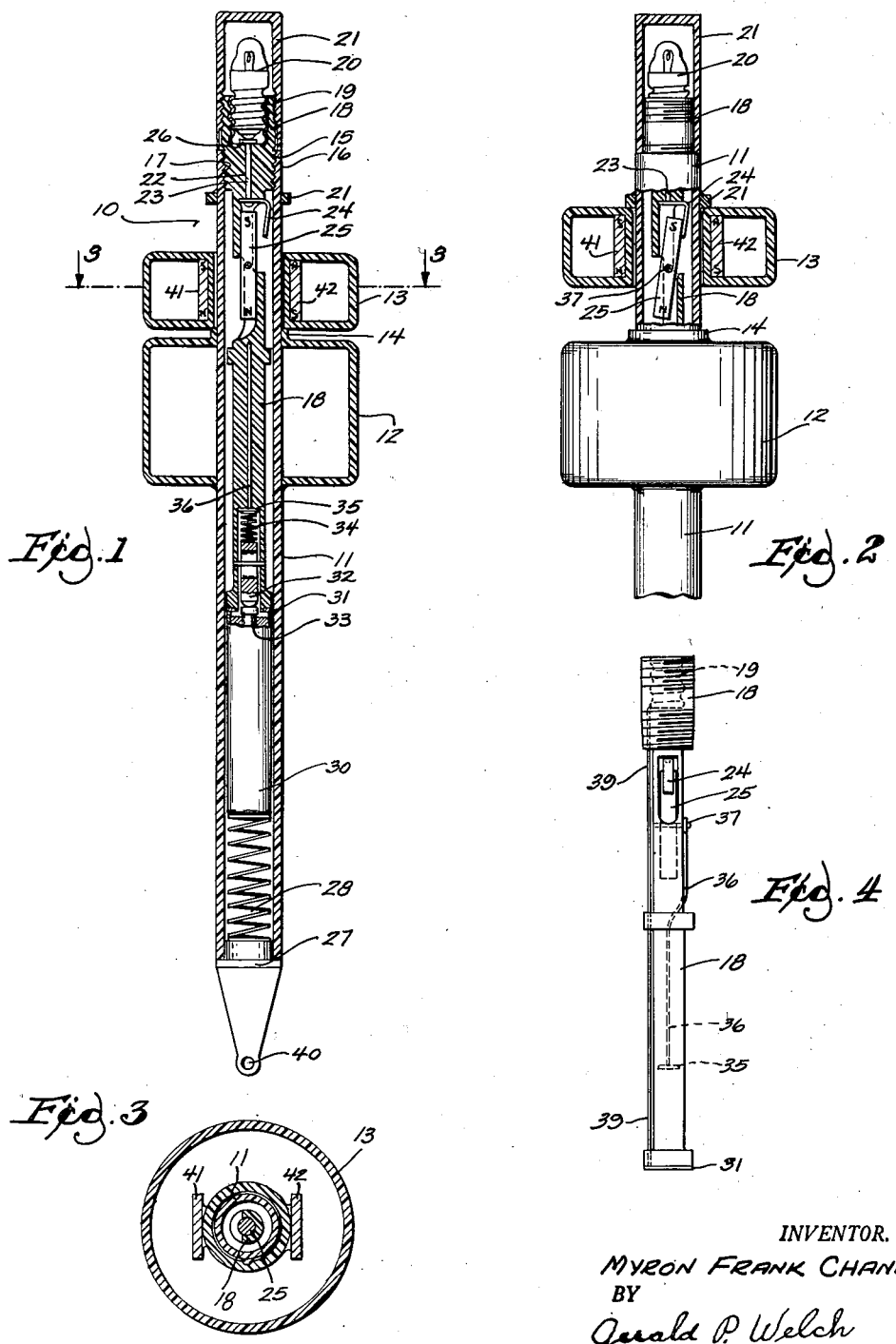

2,790,263
FISHING FLOATS

Myron Frank Chaney, West Allis, Wis.

Application January 17, 1955, Serial No. 482,260

3 Claims. (Cl. 43—17)

This invention relates to improvements in fishing floats, and more particularly to a novel fishing float of the type employing an electric light signal.

An object of the invention is to provide a device of the type having a buoyant element vertically movable on a floated object to actuate a switch for energizing the light.

Another object of the invention is to provide a device of the type employing a magnetic switch.

Other and further objects of the invention will appear as the description proceeds, reference being had to the accompanying drawing, in which:

Fig. 1 is a vertical sectional view of a fishing float embodying the invention.

Fig. 2 is a side view partly in elevation and partly in section of the same.

Fig. 3 is a transverse sectional view taken on line 3—3 of Fig. 1.

Fig. 4 is a detail view of the nonconductive portion of the vertical body member.

Referring more particularly to the drawings, the numeral 10 refers to the device generally having a tubular body portion 11, provided with a relatively large fixed float 12, and a second relatively smaller vertically movable float 13, normally resting on the annular shoulder at 14.

The tubular member 11 is tapped at 15 internally of its upper end 16 to accommodate the threaded portion at 17 of the core element 18, which latter has a threaded socket at 19 to retain the electric light bulb 20. A transparent cap 21 covers the bulb 20. A shoulder 21 on the tubular member 11 limits the upward movement of the float 13.

The core 18 has a central vertical bore at 22 to accommodate the bolt 23, which at its lower end secures the terminal 24 with which the magnet 25 makes contact. A nut 26 at the upper end of the bolt 23 serves as a central terminal for the light bulb 20.

A plug 27 retains a spring 28 within the lower end of the tubular member 11. The spring 28 presses a battery 30 upwardly into contact with a ring terminal 31 and the central terminal 32 which is held in contact with the central terminal 33 of the battery 30 by the spring 34 which abuts the contact plate 35 fastened to the conductor 36 which in turn connects with the magnet pivot pin 37.

The light bulb socket shell 19 has a wire 39 attached thereto which leads downwardly to connect with the ring terminal 31. An eye 40 at the lower end of the plug 27 accommodates the fish line which may be attached thereto in the usual manner.

In use, the float 13 will normally remain at its lower position. The float 13 contains two parallel magnets 41 and 42 disposed vertically oppositely therein adjacent to the tubular member 11. When the float 13 is in lowermost position the mutual action of magnets 41, 42 and 25 will serve to maintain the latter in vertical position out of contact with the terminal 24. During the fishing operation, a tug on the line attached to the eye 40 will lower the tubular member and the fixed float 12 into the water. Float 13 is free to rise because of its buoyancy, and in its raised position the action of magnets 41, 42 and 25 will cause the latter to incline into contact with the terminal 24 thus closing the circuit and illuminating the light bulb 20. If it is desired to keep the light burning, the core 18 may be turned slightly in the tubular member 11 and the magnet 25 will continuously engage the terminal 24.

It will be understood that the device is capable of many modifications in structure and design, without departing from the spirit of the invention, within the scope of the appended claims.

Having thus described the invention, what is claimed and desired to be secured by Letters Patent of the United States, is:

1. A fishing float comprising an elongated body portion, an enlarged circular float element embracing said body portion and affixed thereto, a second circular float mounted for free vertical movement on said body portion, a core of non-conductive material held within said body portion, an electric light bulb held within the upper end of said core, electric circuit means including a magnetic switch within the core, and magnet means within the movable float to activate said switch.

2. A fishing float including an elongated tubular body portion, an enlarged float element embracing said body portion and affixed thereto, a second float mounted for free vertical movement on said body portion, a core of non-conductive material held within said body portion, an electric light bulb held within the upper end of said core, electric circuit means including a magnet bar apertured centrally and pivoted therethrough within the core, and a pair of magnets within the movable float operative to pivot said magnet bar to open and close said circuit.

3. A fishing float including an elongated tubular body portion, an enlarged float element embracing said body portion and affixed thereto, a second float mounted for free vertical movement on said body portion above said fixed float, a core of non-conductive material held within said body portion, a battery beneath said core, a light circuit connected thereto, a pivoted magnetic switch within said circuit in said core, and a pair of fixed magnets in the movable float operative by movement of the latter to open and close said magnetic switch.

References Cited in the file of this patent

UNITED STATES PATENTS

| 2,205,352 | Fisher | June 18, 1940 |

FOREIGN PATENTS

| 162,146 | Germany | 1949 |
| 658,662 | Germany | 1938 |